(No Model.)

J. LONG.
BUGGY TOP RAISER.

No. 429,728. Patented June 10, 1890.

Witnesses:
O. A. Sawyer

Inventor:
Josiah Long

UNITED STATES PATENT OFFICE.

JOSIAH LONG, OF LARCHWOOD, IOWA.

BUGGY-TOP RAISER.

SPECIFICATION forming part of Letters Patent No. 429,728, dated June 10, 1890.

Application filed October 12, 1889. Serial No. 326,889. (No model.)

*To all whom it may concern:*

Be it known that I, JOSIAH LONG, a citizen of the United States, residing at Larchwood, in the county of Lyon and State of Iowa, have invented a new and useful Apparatus to Raise and Lower Buggy-Tops, of which the following is a specification.

My invention has relation to improvements in devices for facilitating the raising and lowering of vehicle-tops; and it consists in the construction, novel combination, and adaptation of devices hereinafter described and claimed.

Figure 1:
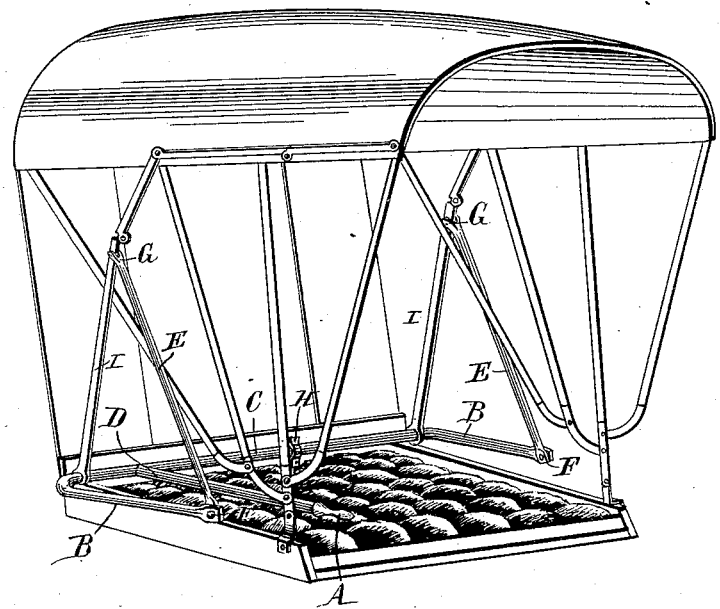
Figure 2:
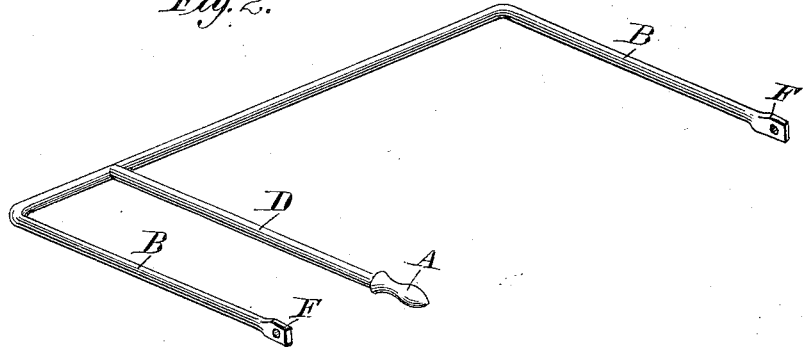
Figure 3:

In the accompanying drawings, Figure 1 is a perspective view of a buggy seat and top, showing my improved device in position. Fig. 2 is a perspective view showing the transverse rocking bar having the angular arms at its ends and the operating-lever secured to its pivotal portion adjacent to the right-hand end thereof, and Fig. 3 is a detail view of the connecting-bar having the bifurcated portion at one end to embrace the brace of the buggy-top.

Referring to the said drawings by letter, C indicates a rocking bar or rod which is attached to the inside of the seat-back of the buggy by suitable straps H, which afford journals for said bar. This rocking bar C is provided at its ends with angular-bent portions B, which occupy the position shown in Fig. 1 when the buggy-top is almost raised. These angular-bent arms B are provided at their outer ends with bolt-holes for the reception of a bolt, connecting them with the connecting-rods E, which in turn are attached at their opposite ends by means of suitable bolts to the main brace-bar I of the buggy-top adjacent to its knee-joint with the short connecting brace-rod.

The lower end of the main brace-rods I of the buggy-top are eyed, as shown, so as to receive the rocking bar C, which is journaled therein.

D indicates the operating-lever of my improved device, which is provided with a handle portion A at its forward end. This lever D is connected to the rocking bar C at a point adjacent to the right-hand end thereof, so as to be convenient to the right hand of the operator, although it is obvious that it might be placed upon the left-hand side, and it may either be rigidly attached to the rocking bar or be cast integral therewith.

It is obvious that the bar C is of a length sufficient to allow the angle-arms B to move outside of the side curtains so as not to interfere therewith.

In operation, when the buggy-top is raised and it is desired to lower it, the lever D is raised, which in turn rocks the bar C, which turns arms B and connecting-bars E up, and the latter, breaking the knee-joint of the top braces, allows the buggy-top to fold and fall backward.

Having described my invention, what I claim is—

The combination, with a carriage seat or frame, of a folding top, the rock-shaft having the angular branches and journaled in said frame, the brace-bars I, journaled at their lower ends on the rock-shaft, the connecting-rods E, pivotally secured at their lower ends to the outer ends of the angular branches of the rock-shaft and their opposite ends secured to the brace-bars near the joint thereof, and the rigid forwardly-extending hand-lever fixed to said rock-shaft, substantially as specified.

JOSIAH LONG.

Witnesses:
CHAS. SHADE,
C. A. HATFIELD.